United States Patent [19]
Collins et al.

[11] Patent Number: 6,074,469
[45] Date of Patent: *Jun. 13, 2000

[54] ASPHALT COMPOSITION AND METHOD

[75] Inventors: James H. Collins, Houston, Tex.;
Glenn R. Jones, Sandy, Utah

[73] Assignee: Petro Source Refining Partners, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 09/071,560

[22] Filed: May 1, 1998

[51] Int. Cl.⁷ .................................................. C09D 195/00
[52] U.S. Cl. ........................ 106/273.1; 106/279; 106/280; 106/281.1; 106/284.03; 524/59; 524/71
[58] Field of Search ................................ 106/273.1, 279, 106/280, 281.1, 284.03

[56] References Cited

U.S. PATENT DOCUMENTS

| | | |
|---|---|---|
| 78,861 | 1/1868 | Wurtz . |
| 100,730 | 3/1870 | Conklin . |
| 1,000,545 | 8/1911 | Page . |
| 1,568,261 | 1/1926 | Bennett et al. . |
| 3,791,965 | 2/1974 | Fitzsimons et al. . |
| 3,864,242 | 2/1975 | Watanabe . |
| 3,923,643 | 12/1975 | Lewis et al. . |
| 4,021,333 | 5/1977 | Habiby et al. . |
| 4,073,720 | 2/1978 | Whisman et al. . |
| 4,097,369 | 6/1978 | Ebel et al. . |
| 4,381,992 | 5/1983 | Wood et al. . |
| 4,512,878 | 4/1985 | Reid et al. ............................ 208/179 |
| 4,983,278 | 1/1991 | Cha et al. . |
| 5,141,628 | 8/1992 | Martin et al. . |
| 5,221,338 | 6/1993 | Gaudio et al. . |
| 5,223,032 | 6/1993 | Gaudio et al. . |
| 5,234,494 | 8/1993 | Sawatzky et al. . |
| 5,244,565 | 9/1993 | Lankton et al. . |
| 5,288,392 | 2/1994 | Santos . |
| 5,302,282 | 4/1994 | Kalnes et al. . |
| 5,306,419 | 4/1994 | Harrison et al. . |
| 5,312,483 | 5/1994 | Sawatzky et al. . |
| 5,385,401 | 1/1995 | Nath . |
| 5,389,691 | 2/1995 | Cha et al. . |
| 5,447,628 | 9/1995 | Harrison et al. . |
| 5,470,455 | 11/1995 | Santos . |
| 5,573,656 | 11/1996 | Santos . |
| 5,618,132 | 4/1997 | Fogg et al. . |

OTHER PUBLICATIONS

CA 73:68308 Brunel., "Coating and waterproofing . . . " Nov. 28, 1969.

*Primary Examiner*—David Brunsman
*Attorney, Agent, or Firm*—Thomason, Moser & Patterson, L.L.P.

[57] ABSTRACT

A paving asphalt composition for improving the durability and longevity of asphalt road surfaces is disclosed. The paving asphalt composition includes asphalt base stock, heavy residuum of re-refined motor oil, and a chemical modifier. The heavy residuum of re-refined motor oil preferably has an API gravity of at least about 12, a kinematic viscosity greater than about 400 centistokes at 140° F., a flash point greater than about 400° F. and a mass loss less than about 3%. The paving asphalt composition may also include a polymer. A method of forming the paving asphalt composition and a method of paving roads are also disclosed.

23 Claims, No Drawings

ASPHALT COMPOSITION AND METHOD

BACKGROUND OF THE INVENTION

1. Field of the Invention

The invention relates to a paving asphalt composition or asphalt binder utilized in paving asphalt road surfaces which provides increased durability, and thus longevity, in a wide range of temperatures. Preferably, the paving asphalt composition is formed using asphalt base stock, heavy residuum of re-refined motor oil, and a chemical modifier. The paving asphalt composition surprisingly provides increased flexibility in extremely cold temperatures, and increased stiffness in extremely hot temperatures thereby increasing the durability of the asphalt road surface over a wide range of temperatures.

2. Description of Related Art

Fluctuating temperatures have an adverse effect on asphalt road surfaces. "Asphalt road surfaces" are defined herein as road surfaces which have been paved with asphalt-based concrete mixtures such as hot mix asphalt concrete. Should the temperature of the asphalt road surface become too hot, the modulus or stiffness of the asphalt decreases and rutting occurs. Rutting is caused by vehicles traveling over a road surface which is not stiff and/or elastic enough to carry the weight of the vehicles. The asphalt road surface is deformed such as by ruts or grooves forming in the asphalt road surface.

Should the temperature become too cold, the flexibility of the asphalt road surface decreases thereby causing the asphalt road surface to become brittle resulting in cracking of the asphalt road surface. Cracking is caused by vehicles traveling over a road surface which does not provide sufficient flexibility to support the weight of the vehicles. Cracking may also occur due to thermal cracking caused when the asphalt road surface shrinks as the temperature drops until stresses in the asphalt road surface increase to the point that they exceed the critical tensile strength causing the asphalt road surface to crack. Accordingly, it is an object of the present invention to provide an paving asphalt composition, or asphalt binder, which provides an asphalt road surface which maintains its flexibility in cold weather and its stiffness in hot weather.

Generally, paving asphalt compositions may include a hard, low penetration asphalt base stock and an oil or cutter stock such as vacuum gas oil. The asphalt base stock is the component which prevents rutting at high temperatures. The oil is the component which prevents cracking at low temperatures. The addition of the oil to the paving asphalt compositions also reduces the affect the asphalt base stock has on preventing rutting and permanent deformation. Prior paving asphalt compositions have encountered difficulties in maintaining a dynamic shear greater than about 1 kPa at a high temperature (measured by the formula G*/sinδ of AASHTO TP5, American Association of State Highway and Transportation Officials), while simultaneously maintaining a direct tension greater than 1% strain at a low temperature (measured by AASHTO TP3, American Association of State Highway and Transportation Officials). Most notably, prior asphalt compositions which provide increased flexibility, and thus increased durability in cold climates, do not provide increased stiffness, and thus increased durability in hot climates. Likewise, prior asphalt compositions which provide increased durability in hot climates do not provide durability in cold climates.

Prior paving asphalt compositions have also included rubber and/or other polymers in an attempt to improve the direct tension at low temperatures and/or the viscoelastic properties, such as dynamic shear, at high temperatures. While such paving asphalt compositions have demonstrated a significant improvement over paving asphalt compositions which do not include rubber and/or polymers, the use of rubber and other polymers is extremely expensive. Accordingly, it is an object of the present invention to develop a paving asphalt composition which simultaneously has a dynamic shear greater than about 1 kPa at a surprisingly high temperature, and a direct tension greater than about 1% at a surprisingly low temperature, without the need for using as much, if any, expensive rubber and other polymers compared to prior paving asphalt compositions.

The susceptibility of the prior paving asphalt compositions to varying temperatures make these paving asphalt compositions poor choices for use in asphalt road surfaces where, during the course of a year, the temperature fluctuates over a wide temperature range. Accordingly, it is an object of the present invention to develop a paving asphalt composition which simultaneously provides increased durability in hot climates and cold climates thereby reducing costs of production relative to prior paving asphalt compositions. In a preferred aspect, as discussed below, a specific version of the invention yields a paving asphalt composition which provides surprisingly effective results in maintaining the flexibility of the asphalt road surface in cold temperatures and the stiffness of the asphalt road surface in hot temperatures.

SUMMARY OF INVENTION

In a broad aspect, the invention is directed to a method of forming a paving asphalt composition, or asphalt binder, which simultaneously has a dynamic shear greater than about 1 kPa at a surprisingly high temperature and a direct tension greater than about 1% at a surprisingly low temperature. In one specific embodiment, the method of forming a paving asphalt composition includes the steps of heating an asphalt base stock at a temperature sufficient to form a liquid asphalt base stock. The liquid asphalt base stock is combined with a heavy residuum of re-refined motor oil to form an asphalt mixture. The liquid asphalt base stock, heavy residuum of re-refined motor oil, or the asphalt mixture is combined with a chemical modifier selected from the group consisting of maleic anhydride, oxygen, sulfur, a strong mineral acid and/or a caustic compound to form a modified asphalt mixture. The modified asphalt mixture is then passed through a high shear mill to form a sheared asphalt mixture. The sheared asphalt mixture is mixed for a time sufficient to form a paving asphalt composition, wherein the paving asphalt composition has a dynamic shear greater than about 1 kPa at a first temperature and a direct tension greater than about 1% at a second temperature.

Another feature of the method of forming a paving asphalt composition is that the first temperature is greater than 65° C. and the difference between the first temperature and the second temperature is at least about 76 degrees. An additional feature of the method of forming a paving asphalt composition is that the second temperature is less than −12° C. and the difference between the first temperature and the second temperature is at least about 76 degrees. A further feature of the method of forming a paving asphalt composition is that the chemical modifier may be present in the asphalt mixture in an amount ranging from at least about 0.05 to about 2 weight percent. An additional feature of the method of forming a paving asphalt composition is that the chemical modifier may be a caustic compound, such as sodium hydroxide, or a strong mineral acid such as phosphoric acid. Another feature of the method of forming a paving asphalt composition is that the asphalt mixture may include at least one polymer, such as a polymer selected from the group consisting of styrene-butadiene, styrene-butadiene-styrene, styrene-butadiene-rubber, ethylene-vinyl-acetate, polyethylene, polypropylene, ethylene-propylene-diene monomer, ethylene-propylene-rubber, styrene-ethylene/butadiene-styrene, and styrene-ethylene-propylene-styrene. A further feature of the method of forming a paving asphalt composition is that the polymer may include a functionalized group, such as a carboxyl group. An additional feature of the method of forming a paving asphalt composition is that the polymer may be present in the asphalt mixture in an amount ranging from at least about 0.01 to about 5 weight percent. Another feature of the method of forming a paving asphalt composition is that the heavy residuum of re-refined motor oil may be present in the asphalt mixture in an amount ranging from at least about 2 to about 80 weight percent. A further feature of the method of forming a paving asphalt composition is that the asphalt base stock may be present in the asphalt mixture in an amount ranging from at least about 20 to about 95 weight percent. An additional feature of the method of forming a paving asphalt composition is that the heavy residuum of re-refined motor oil may have an API gravity of at least about 12, a kinematic viscosity greater than about 400 centistokes at 140° F., a flash point greater than about 400° F. and a mass loss less than about 3%.

In another specific embodiment, the invention is directed to a method of paving roads. The method includes the steps of heating a paving asphalt composition, the paving asphalt composition including asphalt base stock, heavy residuum of re-refined motor oil, and a chemical modifier wherein the paving asphalt composition has a dynamic shear greater than about 1 kPa at a first temperature and a direct tension greater than about 1% at a second temperature. The paving asphalt composition is mixed with aggregate to form a road paving composition. The road paving composition is then applied to a road surface in an amount sufficient to pave the road surface.

Another feature of the method of paving roads is that the first temperature of the paving asphalt composition is greater than 65° C. and the difference between the first temperature and the second temperature is at least about 76 degrees. A further feature of the method of forming a paving asphalt composition is that the second temperature of the paving asphalt composition is less than −12° C. and the difference between the first temperature and the second temperature is at least about 76 degrees. An additional feature of the method of paving roads is that the heavy residuum of re-refined motor oil may have an API gravity of at least about 12, a kinematic viscosity greater than about 400 centistokes at 140° F., a flash point greater than about 400° F. and a mass loss less than about 3%.

In another specific embodiment, the invention relates to a method of paving roads. The method includes the steps of forming a paving asphalt composition, wherein the paving asphalt composition is formed by heating an asphalt base stock at a temperature sufficient to form a liquid asphalt base stock; combining the liquid asphalt base stock with a heavy residuum of re-refined motor oil to form an asphalt mixture; combining a chemical modifier with the asphalt mixture to form a modified asphalt mixture; and mixing the modified asphalt mixture for a time sufficient to form a paving asphalt composition, wherein the paving asphalt composition has a dynamic shear greater than about 1 kPa at a first temperature and a direct tension greater than about 1% at a second temperature. The paving asphalt composition is then mixed with aggregate to form a road paving composition. The road paving composition is then applied to a road surface in an amount sufficient to pave the road surface.

In still another specific embodiment, the invention is directed to a paving asphalt composition for adding to aggregate to pave roads. The paving asphalt composition includes an asphalt base stock, a heavy residuum of re-refined motor oil, and a chemical modifier. The paving asphalt composition has a dynamic shear greater than about 1 kPa at a first temperature and a direct tension greater than about 1% at a second temperature.

A further feature of the paving asphalt composition for adding to aggregate to pave roads is that the heavy residuum of re-refined motor oil may have an API gravity of at least about 12, a kinematic viscosity greater than about 400 centistokes at 140° F., a flash point greater than about 400° F. and a mass loss less than about 3%.

While the invention will be described in connection with specific embodiments, it will be understood that it is not intended to limit the invention to those embodiments. On the contrary, it is intended to cover all alternatives, modifications, and equivalents, as may be included within the spirit and scope of the invention as defined by the appended claims and equivalents thereof.

DETAILED DESCRIPTION AND SPECIFIC EMBODIMENTS

As discussed above, the present invention relates to an asphalt binder or paving asphalt composition which simultaneously has a dynamic shear greater than about 1 kPa at surprisingly high temperatures and a direct tension greater than about 1% at surprisingly low temperatures. A paving asphalt composition is a naturally occurring asphalt or petroleum derived asphalt which is added to aggregate to coat the aggregate to form hot mix asphalt concrete. Generally, the aggregate may include rock, sand and/or gravel and has particle sizes ranging from approximately 50 microns to approximately 2 inches. The paving asphalt composition coats the particles to form the hot mix asphalt concrete. The hot mix asphalt concrete is then placed on a road surface, in an amount sufficient to form an asphalt road surface, and rolled to compact the hot mix asphalt concrete to a required density.

The paving asphalt composition acts as a "glue" to "cement" or bind the aggregate particles together. Thus, hot mix asphalt concrete is a non-homogeneous composite including aggregate and paving asphalt composition. The hot mix asphalt concrete may also include air voids between aggregate particles. While it has been known that the properties and characteristics of the paving asphalt composition affect the durability and longevity of the hot mix asphalt concrete, it has been discovered that, by using heavy residuum of re-refined motor oil and a chemical modifier to form the paving asphalt composition, a hot mix asphalt concrete may be formed which provides durability over a wide range of temperatures. Most notably, the paving asphalt compositions described herein increase the ability of the asphalt road surface to (1) prevent rutting and/or permanent deformation; (2) prevent fatigue cracking due to repeated loading; (3) prevent thermal fatigue cracking from thermal cycling or temperature fluctuation; and (4) prevent thermal cracking from shrinkage caused by low temperatures in a constrained condition.

The asphalt road surfaces formed utilizing the paving asphalt compositions described herein are termed "flexible pavements" in contrast to "rigid pavements" such as Portland cement concrete. The flexibility of the asphalt of road surfaces is due to the viscoelasticity of the paving asphalt composition which "glues" the aggregate of the hot mix asphalt concrete together.

Paving asphalt compositions may also be used in other pavement operations, such as maintenance of asphalt road surfaces. Seal coating is a method of maintaining an asphalt road surface by applying a layer of pure paving asphalt composition which is either hot or emulsified in water. The paving asphalt composition may be sprayed directly onto the top of an existing asphalt road surface. The purpose is to seal cracks and rejuvenate the old asphalt road surface. A layer of aggregate, referred to as "chips" may then be applied onto the paving asphalt composition. While this application of the paving asphalt composition is not a load bearing structure like a thick layer of hot mix asphalt concrete pavement, the advantages realized using the paving asphalt composition in hot mix asphalt concrete are also realized using the paving asphalt composition as a seal coat.

In a specific embodiment, the invention is directed to a method of forming a paving asphalt composition. Broadly, the method includes the steps of heating an asphalt base stock at a temperature sufficient to form a liquid asphalt base stock, mixing the liquid asphalt base stock with a heavy residuum of re-refined motor oil to form an asphalt mixture, and mixing a chemical modifier with the asphalt mixture to form a modified asphalt mixture. In one specific embodiment, the chemical modifier may be combined with the asphalt base stock to form a modified asphalt base stock. The modified asphalt base stock may then be combined with the heavy residuum of re-refined motor oil to form the modified asphalt mixture. In still another specific embodiment, the chemical modifier may be combined with the heavy residuum of re-refined motor oil to form a heavy residuum mixture. The heavy residuum mixture may then be combined with the asphalt base stock to form the modified asphalt mixture. In yet another specific embodiment, the asphalt base stock, heavy residuum of re-refined motor oil, and chemical modifier are combined in one step. Preferably, the asphalt base stock and the heavy residuum of re-refined motor oil are combined to form an asphalt mixture, and the chemical modifier is combined with the asphalt mixture to form a modified asphalt mixture.

"Asphalt base stock" is herein defined as any asphalt material from any commercial or natural source, including re-cycled asphalt material which provides stiffness to an asphalt road surface at high temperatures, and thus, enhances the ability of the asphalt road surface to resist rutting. Accordingly, the asphalt base stock is the component of the paving asphalt composition which provides the high temperature durability of an asphalt road surface. Preferably, the asphalt base stock is not re-cycled, i.e., it is virgin asphalt base stock. Sources of asphalt base stock include those mined from natural sources and those derived from petroleum crude deposits via suitable refining processes such as atmospheric and vacuum distillation, solvent deasphalting, and supercritical extraction processes. While it is contemplated that any asphalt base stock known to persons skilled in the art may be used, examples of suitable asphalt base stocks include Santa Maria asphalt cement (commercially available from Santa Maria Refinery, California), Shell Wood River asphalt cement (Shell Wood River Refinery, Ill.), Gilsonite (a naturally occurring solid asphalt from American Gilsonite Company, Salt Lake City, Utah), Trinidad Lake Asphalt (a naturally occurring solid asphalt from Petro Source Corp., Houston, Tex.), Husky 400/500 penetration asphalt cement (Husky Oil Company, Calgary, Alberta), Venezuelan AC30 (Petroleos de Venezuela, S.A. Curacao Refinery, Caracas, Venezuela), Phillips 15 Pen AC asphalt base stock (Phillips Petroleum Company, Woods Cross, Utah), and ROSE asphalt (Kerr McGee Refining Co., Oklahoma City, Okla.).

The asphalt base stock is preferably heated at a temperature sufficient to form a liquid asphalt base stock substantially free of any solid asphalt base stock particles. The asphalt base stock should preferably have a suitable viscosity to provide efficient pumping and mixing. While it is contemplated that the temperature at which the asphalt base stock is to be heated to form the liquid asphalt base stock will be dependent upon the type of asphalt base stock utilized, generally, the temperature should be at least about 250° F. to about 400° F.

The liquid asphalt base stock should be present in the asphalt mixture in an amount ranging from at least about 20 to about 95 weight percent of the asphalt mixture. Preferably, the liquid asphalt base stock is present in the asphalt mixture in an amount ranging from at least about 45 to 95 weight percent.

"Heavy residuum of re-refined motor oil" is herein defined as the portion of used motor oil remaining after at least one of the light fractions of the used motor oil has been removed. For example, the heavy residuum of re-refined motor oil may be the residue collected after used motor oil has been passed through a re-refining process. Preferably, the heaviest portion of the re-refined used motor oil should be used. While it is contemplated that the heavy residuum of re-refined motor oil may be collected from any re-refining process known to persons skilled in the art, examples of suitable heavy residuums of re-refined motor oil include Genesis V-140 (Genesis Petroleum Salt Lake, L.L.C., Salt Lake City, Utah), Safety Kleen (Safety Kleen Corp., Elgin, Ill.), Renoil (Renkert Oil, Inc., Elverson, Pa.), and Mohawk (Mohawk Lubricants, Ltd., N. Vancouver, British Columbia).

While it is contemplated that the used motor oil which is re-refined may be any used oil such as lubrication oil, specification oil, hydraulic fluid, transmission fluid, passenger car oil, truck oil, and industrial oil, the used motor oil is preferably a combination of used passenger car motor oil and used industrial motor oil, such as that used in large machines, trucks, stationary engines, and turbines. More preferably, the heavy residuum of re-refined motor oil if formed by a re-refining process which includes at least about 40% by volume passenger car motor oil and at least about 25% by volume used industrial motor oil. Preferably, the heavy residuum of re-refined motor oil has an API gravity of at least about 12 as measured by ASTM D3142, a kinematic viscosity greater than about 400 centistokes at 140° F. as measured by ASTM D2170, a flash point greater than about 400° F. as measured by ASTM D92, and a mass loss less than about 3% as measured by ASTM D2872.

It has been discovered that used motor oil, which is subsequently re-refined and incorporated into paving asphalt compositions, provides flexibility to an asphalt road surface at low temperatures, and thus, enhances the ability of the asphalt road surface to resist cracking. Accordingly, the heavy residuum of re-refined motor oil is the component of the paving asphalt composition which provides the low temperature durability of an asphalt road surface. It is contemplated that the oil in passenger cars and industrial motors forms modified polymers during the motor oil's use in the passenger cars and industrial motors. It is further contemplated that the re-refining process facilitates isolation and/or amplification of these polymers, which, when incorporated into the paving asphalt composition utilizing the embodiments of the invention, provide a paving asphalt composition which provides flexibility at low temperatures.

The heavy residuum of re-refined motor oil should be present in the asphalt mixture in an amount ranging from at least about 2 to about 80 weight percent of the asphalt mixture. Preferably, the heavy residuum of re-refined motor oil is present in the asphalt mixture in an amount ranging from at least about 5 to about 55 weight percent.

"Chemical modifier" is herein defined as any chemical compound which increases the temperature at which the paving asphalt composition will maintain a dynamic shear of at least 1 kPa. It is contemplated that the chemical modifier reacts with the asphalt base stock to enhance the ability of the asphalt base stock to resist rutting. In other words, the contemplated chemical reaction between the asphalt base stock and the chemical modifier provides increased stiffness to an asphalt road surface at high temperatures. It is also contemplated that the chemical modifier reacts with the asphaltenes of the asphalt base stock. Asphaltenes, as defined by ASTM D3279, are the fraction of the asphalt base stock that are insoluble in n-heptane. It is further contemplated that the chemical modifier, which include functional groups, chemically modifies the asphalt base stock, thereby enhancing the ability of the asphalt base stock to form an unexpectedly superior paving asphalt composition when combined with the heavy residuum of re-refined motor oil. Surprisingly, because of the contemplated chemical reaction between the asphalt base stock and the chemical modifier, the resulting enhanced rutting resistance of the paving asphalt composition is not substantially reduced when the heavy residuum of re-refined motor oil is added to form the modified asphalt mixture.

Examples of suitable chemical modifiers include oxygen, sulfur, caustic compounds, strong mineral acids, and maleic anhydride. Preferably, the chemical modifier is either a caustic compound, such as sodium hydroxide, magnesium hydroxide, potassium hydroxide, and calcium hydroxide, or a strong mineral acid, such as phosphoric acid, hydrochloric acid, nitric acid, and sulfuric acid. Preferably, the caustic compound is substantially free of water, i.e., is in dry or pellet form, and the mineral acid is substantially free of water, i.e., in anhydrous form. The chemical modifier is present in the asphalt mixture in an amount sufficient to increase the temperature at which the paving asphalt composition will maintain a dynamic shear of at least 1 kPa. Preferably, the chemical modifier is present in the asphalt mixture in an amount ranging from at least about 0.01 to about 5 weight percent of the total weight of the asphalt mixture. More preferably, the chemical modifier is present in the asphalt mixture in an amount ranging from at least about 0.05 to about 2 weight percent. The chemical modifier should be combined with the asphalt mixture at a temperature of at least about 360° F. to about 450° F. Preferably, the temperature is about 420° F. During addition of the chemical modifier, it is important to maintain a turbulent agitation to keep the chemical modifier suspended in the asphalt mixture until the reaction is complete. Generally, the reaction is completed within 30 minutes.

Preferably, the modified asphalt mixture is immediately passed through a high shear mill to form a sheared asphalt mixture. It is contemplated that the high shear mill enhances the intimate association of the chemical modifier with the asphalt base stock and the heavy residuum of re-refined motor oil. In one embodiment, the asphalt base stock, heavy residuum or re-refined motor oil, and chemical modifier are mixed and sheared simultaneously. While it is contemplated that any high shear mill known in the art may be used to form the sheared liquid asphalt mixture, preferably, the sheared liquid asphalt mixture is formed at a temperature of at least about 350° F. to about 450° F. at a shear rate of at least about 10,000 sec$^{-1}$. Shear rate is defined as the ratio of the speed of the moving part of the mixer or rotor to the gap between the moving part and stationary part or stator of the mixer. For example, a Silverson L4R mixer with a diameter of 30 mm and a gap of approximately 0.1 mm rotating at 3,000 rpm would provide a shear rate of about 50,000 sec$^{-1}$. Shear rates suitable to this embodiment of the invention may be achieved on a laboratory scale with mixers manufactured by, for example, Silverson or Ross, and on a commercial scale with mixers manufactured by, for example, Dalworth or Siefer. More preferably, the sheared liquid asphalt mixture is formed at a temperature of at least about 350° F. to about 450° F. at a shear rate of at least about 20,000 sec$^{-1}$ to about 50,000 sec$^{-1}$.

The sheared asphalt mixture should be continually agitated or mixed for a time sufficient to form a paving asphalt composition. The paving asphalt composition is preferably formed as a result of mixing the sheared asphalt composition until a uniform, complete chemical reaction has occurred resulting in consistent physical properties throughout the paving asphalt composition. The sheared asphalt mixture is preferably mixed for at least about 20 minutes to about 90 minutes at a temperature ranging from at least about 350° F. to about 450° F. to form the paving asphalt composition. Preferably, the sheared asphalt composition is mixed for at least 30 minutes at a temperature of at least 380° F. Water, in the form of steam, is created as a bi-product of some chemical reactions during the agitation of the sheared asphalt composition. Accordingly, the sheared asphalt mixture should be mixed at the bottom to release the steam and prevent bubbling.

The formed paving asphalt composition should simultaneously have a dynamic shear greater than about 1 kPa at a high temperature, or first temperature, and a direct tension greater than about 1% at a low temperature, or second temperature. The first temperature is preferably greater than about 64° C., and more preferably, the first temperature is greater than about 68° C. Even more preferably, the first temperature is greater than about 70° C. The second temperature is preferably less than about −12° C., and more preferably, the second temperature is less than about −16° C. Even more preferably, the second temperature is less than about −18° C.

The test temperature spread, or difference, between the first temperature and the second temperature is preferably at least 76 degrees. More preferably, the test temperature spread is at least 78 degrees, and even more preferably, the test temperature spread is at least 80 degrees. The test temperature spread is the measure of temperature fluctuation at which a paving asphalt composition can simultaneously maintain a dynamic shear greater than 1 kPa and a direct tension greater than 1% as determined by the dynamic shear and direct tension tests. Accordingly, the larger the test temperature spread, the more locations at which the paving asphalt composition may be utilized without the need for location-specific modification due to temperature differences.

Because of the unique characteristics of the paving asphalt composition described herein, hot asphalt mix concrete may be formed using the disclosed paving asphalt compositions which are suitable for environments where the temperature drops below −22° C. during the winter and rises above 64° C. in the summer. As will be discussed below in greater detail, dynamic shear is the measure of the stiffness of the paving asphalt composition at high temperatures, and direct tension is the measure of the flexibility of the paving asphalt composition at low temperatures.

In another specific embodiment of the invention, the asphalt mixture includes at least one polymer which provides increased flexibility at low temperatures and/or increased stiffness at high temperatures. Preferably, the polymer is present in the asphalt mixture in an amount ranging from at least about 0.01 to about 5 weight percent of the total weight of the asphalt mixture. More preferably, the polymer is present in the asphalt mixture in an amount ranging from at least about 0.05 to about 2 weight percent. While it is contemplated that any polymer known to those skilled in the art may be used in the liquid asphalt composition, preferably, the polymer is selected from the group consisting of styrene-butadiene, styrene-butadiene-styrene, styrene-butadiene-rubber, ethylene-vinyl-acetate, polyethylene, polypropylene, ethylene-propylene-diene monomer, ethylene-propylene-rubber, styrene-ethylene/butadiene-styrene, and styrene-ethylene-propylene-styrene. Preferably, the polymer also includes a functionalized group, including, but not limited to, functionalized groups such as carboxyl, carbonyl, epoxides, sulfides, sulfoxides, halogens, and hydroxyl. The polymer, preferably is a functionalized low density polyethylene. When using an unsaturated polymer, such as styrene-butadiene-styrene, high shear mixing is an important step in the method to ensure complete dispersion of the polymer and formation of a morphology which may be fixed by a chemical modifier.

In still another aspect, the invention relates to a method of paving roads. The method includes the steps of heating the paving asphalt composition described above and mixing the paving asphalt composition with aggregate to form a road paving composition. The road paving composition should then be applied to a road surface in an amount sufficient to pave the road surface. After the road paving composition is applied to the road surface, it should be compacted to the required or desired density.

While it is contemplated that any method known to persons skilled in the art may be employed to pave the road surface using the paving asphalt composition described above, in another specific embodiment, the method of paving roads includes the steps of heating the paving asphalt composition at a temperature such that the paving asphalt composition is liquid, i.e., has substantial flowability to permit pumping, spraying, and coating for application in the field. The paving asphalt composition should not produce excess smoke and pollution when heated. The heated paving asphalt composition may then be applied to a road surface. Preferably, the heated paving asphalt composition is sprayed onto the road surface to provide a coating which substantially covers the entire road surface desired to be paved. It is noted, however, that the paving asphalt composition may be applied to the road surface in any manner known to those skilled in the art. For example, the paving asphalt composition may be applied to the road surface as an emulsion.

After the paving asphalt composition is applied to the road surface, crushed aggregate may be applied to the road surface in an amount sufficient to pave the road surface, and compacted into the desired or necessary density to provide a suitable asphalt road surface.

EXAMPLES

A series of tests was conducted which demonstrate certain advantageous features of the invention. The performance of the paving asphalt composition samples formed using the specific embodiments of the paving asphalt composition and methods of forming the paving asphalt composition is influenced by the physical or material properties of the paving asphalt composition. The Strategic Highway Research Program ("SHRP") has identified various indicators used to identify those viscoelastic properties of the paving asphalt composition that contribute directly to the performance of the hot mix asphalt concrete. Two of these tests, dynamic shear rheometer and direct tension, relate to the durability of the paving asphalt composition at high and low temperatures, respectively. The dynamic shear rheometer, or dynamic shear, measures the paving asphalt composition's resistance to permanent deformation such as rutting. In other words, dynamic shear rheometer measures the modulus or stiffness of the paving asphalt composition at high temperatures where rutting occurs. The dynamic shear is determined by the formula $G^*/\sin\delta$, where $G^*$ is the complex modulus, and $\delta$ is phase angle.

The dynamic shear of the paving asphalt composition influences the Theological properties of the hot mix asphalt concrete at elevated temperatures. According to SHRP, acceptable paving asphalt compositions must possess a dynamic shear greater than 1 kPa at a given test temperature to be used in a hot mix asphalt concrete which may be applied to a road surface where the temperature of the road surface reaches that temperature. The temperature determined by the dynamic shear test is the maximum paving design temperature. For example, a paving asphalt composition which has a dynamic shear greater than 1 kPa at 64° C. may be used in a hot mix asphalt concrete which is applied to a road surface where the average seven day maximum pavement design temperature normally never rises above 64° C. This requirement may be increased when traffic loading is increased.

Direct tension measures the paving asphalt composition's resistance to cracking caused by low temperatures. In other words, direct tension measures the flexibility of a paving asphalt composition at low temperatures. According to SHRP acceptable paving asphalt compositions must withstand an imposed strain greater than 1% at a given test temperature to be used in a hot mix asphalt concrete which may be applied to a road surface where the temperature of the road surface reaches that temperature. The test temperature at which the direct tension is measured is then used to determine the minimum pavement design temperature. As determined by AASHTO MP-1, American Association of State Highway and Transportation Officials, the minimum pavement design temperature is 10° C. lower than the test temperature. Accordingly, a paving asphalt composition which has a direct tension greater than 1% at −12° C. may be used in a hot mix asphalt concrete which is applied to a road surface where the pavement design temperature normally never drops below −22° C.

After the maximum pavement design temperature and the minimum pavement design temperatures are determined, the pavement design temperature spread can be calculated. The pavement design temperature spread reflects the temperature fluctuation that a paving asphalt composition can be used and still simultaneously provide a dynamic shear greater than about 1 kPa and a direct tension greater than about 1%. The pavement design temperature spread is the difference, in degrees Celsius, between the maximum pavement design temperature and the minimum pavement design temperature. Accordingly, a paving asphalt composition which has a maximum pavement design temperature of 64° C. and a minimum pavement design temperature of −22° C. has a pavement design temperature spread of 88° C.

Each example was formed by preheating the asphalt base stock in an oven to about 275° F. or until sufficiently fluid to pour. The heavy residuum of re-refined motor oil was also preheated to about 200° F. or until sufficiently fluid to pour. The asphalt base stock and the heavy residuum of re-refined motor oil were combined to form an asphalt mixture and placed on a hot plate. A high shear mixer was then placed in the asphalt mixture. The asphalt mixture was then heated under continual agitation to about 360° F. The chemical modifier was then combined with the asphalt mixture, under agitation, to form the modified asphalt mixture. The high shear mixer agitated the modified asphalt mixture, ensuring the chemical modifier reacted with the asphalt mixture. The modified asphalt mixture remained under high shear for a period of 15 to 60 minutes or until all or substantially all of the bubbling ceased. The sample was then removed from the mixer and allowed to age over night in an oven at a temperature of at least about 250° F. to about 350° F. After aging overnight, the sample was tested to determine the dynamic shear and the direct tension. Results are in Table I.

Eleven paving asphalt composition examples were prepared using different asphalt base stocks, different heavy residuums of re-refined motor oil, and chemical modifiers. Four of the paving asphalt compositions, Examples 5, 8, 9, and 11 were formed using polymer. The paving asphalt compositions were formed using the following reactants.

Example 1 was formed using 78.8% Santa Maria 40/45 Pen asphalt base stock, 20% Genesis V-140 heavy residuum of re-refined motor oil (Genesis Petroleum Salt Lake, L.L.C., Salt Lake City, Utah), and 1.2% sodium hydroxide. Example 2 was formed using 68.8% Santa Maria 40/45 Pen asphalt base stock, 30% Safety Kleen heavy residuum of re-refined motor oil (Safety Kleen Corp., Elgin, Ill.), and 1.2% sodium hydroxide. Example 3 was formed using 73.8% Santa Maria 40/45 Pen asphalt base stock, 25% Renoil heavy residuum of re-refined motor oil (Renkert Oil, Inc., Elverson, Pa.), and 1.2% sodium hydroxide. Example 4 was formed using 73.8% Santa Maria 40/45 Pen asphalt base stock, 25% Mohawk heavy residuum of re-refined motor oil (Mohawk Lubricants, Ltd., N. Vancouver, British Columbia), and 1.2% sodium hydroxide. Example 5 was formed using 78.8% Venezuelan AC30 asphalt base stock (Petroleos de Venezuela, S.A. Curacao Refinery, Caracas, Venezuela), 20% Genesis V-140 heavy residuum of re-refined motor oil, 1% functionalized low density polyethylene (Eastman Chemical Co.), and 1.2% sodium hydroxide. Example 6 was formed using 28.8% Gilsonite asphalt base stock, 70% Genesis V-140 heavy residuum of re-refined motor oil, and 1.2% sodium hydroxide. Example 7 was formed using 28.8% Gilsonite asphalt base stock, 70% Genesis V-140 heavy residuum of re-refined motor oil, and 1.2% phosphoric acid. Example 8 was formed using 58.8% Phillips 15 Pen AC asphalt base stock (Phillips Petroleum Company, Woods Cross, Utah), 40% Genesis V-140 heavy residuum of re-refined motor oil, 1% functionalized low density polyethylene (Eastman Chemical Co.), and 1.2% sodium hydroxide. Example 9 was formed using 58.8% Phillips 15 Pen AC asphalt base stock, 40% Genesis V-140 heavy residuum of re-refined motor oil, 1% functionalized low density polyethylene (Eastman Chemical Co.), and 1.2% sodium hydroxide. Example 10 was formed using 18% Gilsonite asphalt base stock, 39.3% Husky 400/500 penetration asphalt base stock (Husky Oil Company, Calgary, Alberta), 42% Genesis V-140 heavy residuum of re-refined motor oil, and 0.7% phosphoric acid. Example 11 was formed using 18% Gilsonite asphalt base stock, 38.3% Husky 400/500 penetration asphalt base stock, 42% Genesis V-140 heavy residuum of re-refined motor oil, 1% functionalized low density polyethylene (Eastman Chemical Co.), and 0.7% phosphoric acid.

TABLE I

| EXAMPLE | DYNAMIC SHEAR $(G^*/\sin\delta, kPa)^a$ | DIRECT TENSION (% Strain)$^b$ | SHRP PAVEMENT DESIGN TEMPERATURE SPREAD$^c$ |
| --- | --- | --- | --- |
| 1 | 1.72 @ 64° C. | 1.11 @ −24° C. | 98° C. |
| 2 | 1.00 @ 64° C. | 1.95 @ −24° C. | 98° C. |
| 3 | 1.69 @ 64° C. | 1.19 @ −30° C. | 104° C. |
| 4 | 1.28 @ 70° C. | 1.15 @ −24° C. | 104° C. |
| 5 | 1.48 @ 64° C. | 1.34 @ −30° C. | 104° C. |
| 6 | 2.84 @ 88° C. | 7.40 @ −36° C. | 134° C. |
| 7 | 2.08 @ 94° C. | 7.39 @ −36° C. | 140° C. |
| 8 | 1.86 @ 64° C. | 1.37 @ −30° C. | 104° C. |
| 9 | 1.91 @ 70° C. | 1.22 @ −30° C. | 110° C. |
| 10 | 1.58 @ 70° C. | 1.06 @ −36° C. | 116° C. |
| 11 | 1.46 @ 76° C. | 1.03 @ −36° C. | 122° C. |

$^a$Determined by AASHTO TP5.
$^b$Determined by AASHTO TP3.
$^c$Determined by AASHTO MP-1.

These results indicate that these specific embodiments of the paving asphalt compositions exceed the SHRP requirements for dynamic shear and direct tension at surprisingly high and low temperatures simultaneously. For example, Example 4 provides a paving asphalt composition which may be mixed with aggregate to form a hot mix asphalt concrete suitable for environments where the temperature fluctuates from a high of 70° C. to a low of −34° C., a 104 degree or pavement design temperature spread, or temperature fluctuation. In fact, one example, Example 7, provides a paving asphalt composition which may be mixed with aggregate to form a hot mix asphalt concrete suitable for environments where the temperature fluctuates from a high of 94° C. to a low of −46° C., a 140 degree temperature fluctuation. These results show the wide range of temperatures, and thus, wide range of climates, that the paving asphalt compositions may be used to form asphalt road surfaces without loss of stiffness during the summer months when the temperature rises, or flexibility during the winter months when the temperature drops. Accordingly, the durability of roads constructed using the paving asphalt composition of these examples provide cost savings because only one hot mix asphalt concrete is required to pave road surfaces where the temperature fluctuates over these wide temperature ranges. Therefore, re-configuring plants to produce various different paving asphalt compositions to be used in roads in different climates is not required. In addition, very significant savings result due to the reduction or elimination of including rubber or other polymers to the paving asphalt composition.

It is to be understood that the invention is not limited to the exact details of construction, operation, exact materials or embodiments shown and described, as obvious modifications and equivalents will be apparent to one skilled in the art. Various components may be configured or connected in a variety of ways to carry out the method of the invention. As mentioned above, different types of the asphalt base stock and heavy residuum of re-refined motor oil, from various sources, may be used to form the paving asphalt composition. Further, the paving asphalt composition may also be used in roofing and other industrial applications. Like road surfaces, roofs expand and contract due to fluctuations in temperatures. Additionally, various types of equipment may be used to carry out the method of the invention. Accordingly, the scope of the invention should be determined based on the claims below, including any equivalents thereof.

What is claimed is:

1. A method of forming a paving asphalt composition comprising the steps of:

heating an asphalt base stock at a temperature sufficient to form a liquid asphalt base stock;

combining the liquid asphalt base stock with a heavy residuum of re-refined motor oil to form an asphalt mixture;

combining the liquid asphalt base stock, the heavy residuum of re-refined motor oil, or the asphalt mixture with a chemical modifier selected from the group consisting of maleic anhydride, oxygen, sulfur, a strong mineral acid and a caustic compound to form a modified asphalt mixture;

passing the modified asphalt mixture through a high shear mill to form a sheared asphalt mixture; and mixing the sheared asphalt mixture for a time sufficient to form a paving asphalt composition, wherein the paving asphalt composition has a dynamic shear greater than about 1 kPa at a first temperature and a direct tension greater than about 1% at a second temperature.

2. The method of claim 1, wherein the first temperature is greater than about 65° C. and the difference between the first temperature and the second temperature is greater than about 76 degrees.

3. The method of claim 1, wherein the second temperature is less than about −12° C. and the difference between the first temperature and the second temperature is greater than about 76 degrees.

4. The method of claim 1, wherein the chemical modifier is present in the asphalt mixture in an amount ranging from at least about 0.05 to about 2 weight percent.

5. The method of claim 4, wherein the chemical modifier is a caustic compound.

6. The method of claim 5, wherein the caustic compound is sodium hydroxide.

7. The method of claim 4, wherein the chemical modifier is a strong mineral acid.

8. The method of claim 7, wherein the strong mineral acid is phosphoric acid.

9. The method of claim 1, wherein the asphalt mixture includes at least one polymer.

10. The method of claim 9, wherein the polymer is present in the asphalt mixture in an amount ranging from at least about 0.01 to about 5 weight percent.

11. The method of claim 10, wherein the polymer is selected from the group consisting of styrene-butadiene, styrene-butadiene-styrene, styrene-butadiene-rubber, ethylene-vinyl-acetate, polyethylene, polypropylene, ethylene-propylene-diene monomer, ethylene-propylene-rubber, styrene-ethylene/butadiene-styrene, and styrene-ethylene-propylene-styrene.

12. The method of claim 11, wherein the polymer includes a functionalized group.

13. The method of claim 12, wherein the functionalized group is a carboxyl group.

14. The method of claim 1, wherein the heavy residuum of re-refined motor oil is present in the asphalt mixture in an amount ranging from at least about 2 to about 80 weight percent.

15. The method of claim 1, wherein the asphalt base stock is present in the asphalt mixture in an amount ranging from at least about 20 to about 95 weight percent.

16. The method of claim 1, wherein the heavy residuum of re-refined motor oil has an API gravity of at least about 12, a kinematic viscosity greater than about 400 centistokes at 140° F., a flash point greater than about 400° F. and a mass loss less than about 3%.

17. A method of paving roads comprising the steps of:

heating a paving asphalt composition, the paving asphalt composition including asphalt base stock, heavy residuum of re-refined motor oil, and a chemical modifier wherein the paving asphalt composition has a dynamic shear greater than about 1 kPa at a first temperature and a direct tension greater than about 1% at a second temperature;

mixing the paving asphalt composition with aggregate to form a road paving composition; and applying the road paving composition to a road surface in an amount sufficient to pave the road surface.

18. The method of claim 17, wherein the first temperature is greater than about 65° C. and the difference between the first temperature and the second temperature is greater than about 76 degrees.

19. The method of claim 17, wherein the second temperature is less than about −12° C. and the difference between the first temperature and the second temperature is greater than about 76 degrees.

20. The method of claim 17, wherein the heavy residuum of re-refined motor oil has an API gravity of at least about 12, a kinematic viscosity greater than about 400 centistokes at 140° F., a flash point greater than about 400° F. and a mass loss less than about 3%.

21. A method of paving roads comprising the steps of:

forming a paving asphalt composition, wherein the paving asphalt composition is formed by heating an asphalt base stock at a temperature sufficient to form a liquid asphalt base stock; combining the liquid asphalt base stock with a heavy residuum of re-refined motor oil to form an asphalt mixture; combining a chemical modifier with the asphalt mixture to form a modified asphalt mixture; and mixing the modified asphalt mixture for a time sufficient to form a paving asphalt composition, wherein the paving asphalt composition has a dynamic shear greater than about 1 kPa at a first temperature and a direct tension greater than about 1% at a second temperature;

mixing the paving asphalt composition with aggregate to form a road paving composition; and applying the road paving composition to a road surface in an amount sufficient to pave the road surface.

22. A paving asphalt composition for adding to aggregate to pave roads comprising:

asphalt base stock;

heavy residuum of re-refined motor oil;

a chemical modifier;

wherein the paving asphalt composition has a dynamic shear greater than about 1 kPa at a first temperature and a direct tension greater than about 1% at a second temperature.

23. The paving asphalt composition of claim 22, wherein the heavy residuum of re-refined motor oil has an API gravity of at least about 12, a kinematic viscosity greater than about 400 centistokes at 140° F., a flash point greater than about 400° F. and a mass loss less than about 3%.

* * * * *